United States Patent [19]
Jeong

[11] Patent Number: 6,112,649
[45] Date of Patent: Sep. 5, 2000

[54] SAFETY SWITCH STRUCTURE OF A MIXER ADJUSTABLE FOR A JUICE EXTRACTOR

[75] Inventor: Jong Deuk Jeong, Busan, Rep. of Korea

[73] Assignee: Ulim Electronic Co., Ltd., Kyungnam, Rep. of Korea

[21] Appl. No.: 09/452,616

[22] Filed: Dec. 1, 1999

[30] Foreign Application Priority Data

Jun. 30, 1999 [KR] Rep. of Korea ...................... 99-12177

[51] Int. Cl.[7] .................................................. A23N 1/00
[52] U.S. Cl. .................. 99/492; 99/340; 99/511; 99/513; 241/37.5; 241/92; 366/314; 366/601
[58] Field of Search ............... 99/492, 509–513, 99/340; 366/291, 297–300, 314, 601; 241/37.5, 92, 282.1, 282.2, 101.01, 101.2; 494/36, 37, 43, 47, 85, 10; 426/61, 63, 49, 52, 533, 599, 640, 231, 233

[56] References Cited

U.S. PATENT DOCUMENTS

| | | | |
|---|---|---|---|
| 3,722,831 | 3/1973 | Bialas et al. | 366/291 |
| 3,895,781 | 7/1975 | Lodige et al. | 366/291 X |
| 4,189,241 | 2/1980 | Baldacci | 366/297 |
| 4,542,857 | 9/1985 | Akasaka | 241/92 |
| 4,691,870 | 9/1987 | Fukunaga et al. | 241/37.5 X |
| 4,747,695 | 5/1988 | Schmidt | 366/291 |
| 4,799,626 | 1/1989 | Hickel et al. | 241/282.1 X |
| 4,911,557 | 3/1990 | Dormer et al. | 366/314 X |
| 5,071,077 | 12/1991 | Arroubi et al. | 241/282.2 X |
| 5,257,575 | 11/1993 | Harrison et al. . | |
| 5,355,784 | 10/1994 | Franklin et al. . | |
| 5,417,152 | 5/1995 | Harrison . | |
| 5,435,237 | 7/1995 | Huang | 99/492 |
| 5,524,530 | 6/1996 | Nijzingh et al. | 99/492 |
| 5,662,032 | 9/1997 | Baratta | 366/314 X |
| 5,806,413 | 9/1998 | Trovinger | 366/601 |

*Primary Examiner*—Timothy Simone
*Attorney, Agent, or Firm*—John L. Chiatalas

[57] ABSTRACT

This invention relates to a safety switch structure of a mixer adjustable for a juice extractor in which one safety switch is bound to a main body to which a mixer adjustable for a juice extractor is connected in turns; the bound switch is operated by each special pressing device; the pressing devices are installed to be connected to the pressing devices installed separately at the juice extracting cup and the mixing cup, whereby each safety switch is operated when each juice extracting cup or mixing cup is connected to the main body so that all of the juice extracting cup and the mixing cup used in two ways can be used safely.

1 Claim, 7 Drawing Sheets

SAFETY SWITCH STRUCTURE OF A MIXER ADJUSTABLE FOR A JUICE EXTRACTOR

BACKGROUND OF THE INVENTION

1. Field of the Invention

This invention relates to a safety switch structure of a mixer adjustable for a juice extractor, particularly to a safety switch structure in which each of a different juice extracting cup and a different mixing cup is used to one main body; each pressing device is formed at the top portion of the main body; each changing cup comprises a separate pressing means; and the safety switch is controlled by the insertion or the detachment of the changing cups so that with only one safety switch a juice extractor and a mixer can be used.

2. Description of the Prior Art

Generally, a mixer is for pulverizing fruits and foods to small pieces, wherein the main body including a driving motor is formed to be separated from the mixer cup comprising a rotary blade, if the driving motor in the main body is rotated after binding the main body with the mixing cup including foods for which it is pulverized, the rotary blade in the mixing cup is rotated by a clutch at high speed to pulverize foods.

Also, as a juice extractor is for extracting easily only juice from fruits or vegetables without destructing nutrients, the main body including a driving motor and the juice extracting cup comprising blade basket are separately formed to be connected with each other. If a pressing bar is pressed with rotating the driving motor in the main body after putting fruit and vegetable pieces into the top entrance of a juice extracting cup, the blade basket is rotated at high speed to pulverize fruits and vegetables so that the juice and the dregs separated by the rotary centrifugal force are divided by a filter thereby collecting the divided juice into a container to be drunk.

Since such mixer or juice extractor of which the mixing cup or the juice extracting cup is separated from the main body expose the rotary blade etc. to the outside, it is very dangerous in case the driving motor of the main body is operated. Recently, at the state that a mixing cup or a juice extracting cup is separated from the main body, a separate switch is to be shut off in order not to operate the driving motor in the main body, and if the main body is again assembled with the mixing cup or the juice extracting cup, the switch is connected to keep the driving motor rotatable.

According to the development and the variation of various food cultures, such mixer and juice extractor have diffused widely to be used. Recently, a mixer adjustable for a juice extractor has been produced, wherein the above mixing cup and juice extracting cup are used to one main body by changing so that the kitchen space can be efficiently used as well as the use thereof is more convenient.

However, the mixer adjustable for a juice extractor as above has a problem that the shape and the design of each cup are different and the operation is also different so that in case of using them in changing the safety switch can not be installed separately.

Namely, each cup is used in turns so that only one safety switch structure does not satisfy that of the juice extractor or the mixer which is used for two ways, whereby only the exclusive safety switch structure of the juice extracting cup or the mixing cup which is mainly used is selected, with regard to the other, the safety switch structure can not be selected due to the characteristic of the structure. Thus, one of a juice extracting cup or a mixing cup which does not have a safety switch structure is destined to be used in the very dangerous state.

SUMMARY OF THE INVENTION

As this invention is designed to solve the above, the object of this invention produces the safety switch structure of a mixer adjustable for a juice extractor, wherein one safety switch is bound to the main body to which the adjustable mixer and juice extractor are connected in turns; the bound switch is operated by each special pressing device; and said each pressing device is connected to another pressing device which is separately installed at the juice extracting cup or the mixing cup, whereby, if each juice extracting cup or mixing cup is connected to the main body, the safety switch is operated by each pressing device so that both of the juice extracting cup and the mixing cup used for two ways can be used safely.

BRIEF DESCRIPTIONS OF THE DRAWINGS

DESCRIPTION OF THE PREFERRED EMBODIMENT

Referring now to the attached drawings, the embodiments according to this invention are described in detail.

Figure 1:
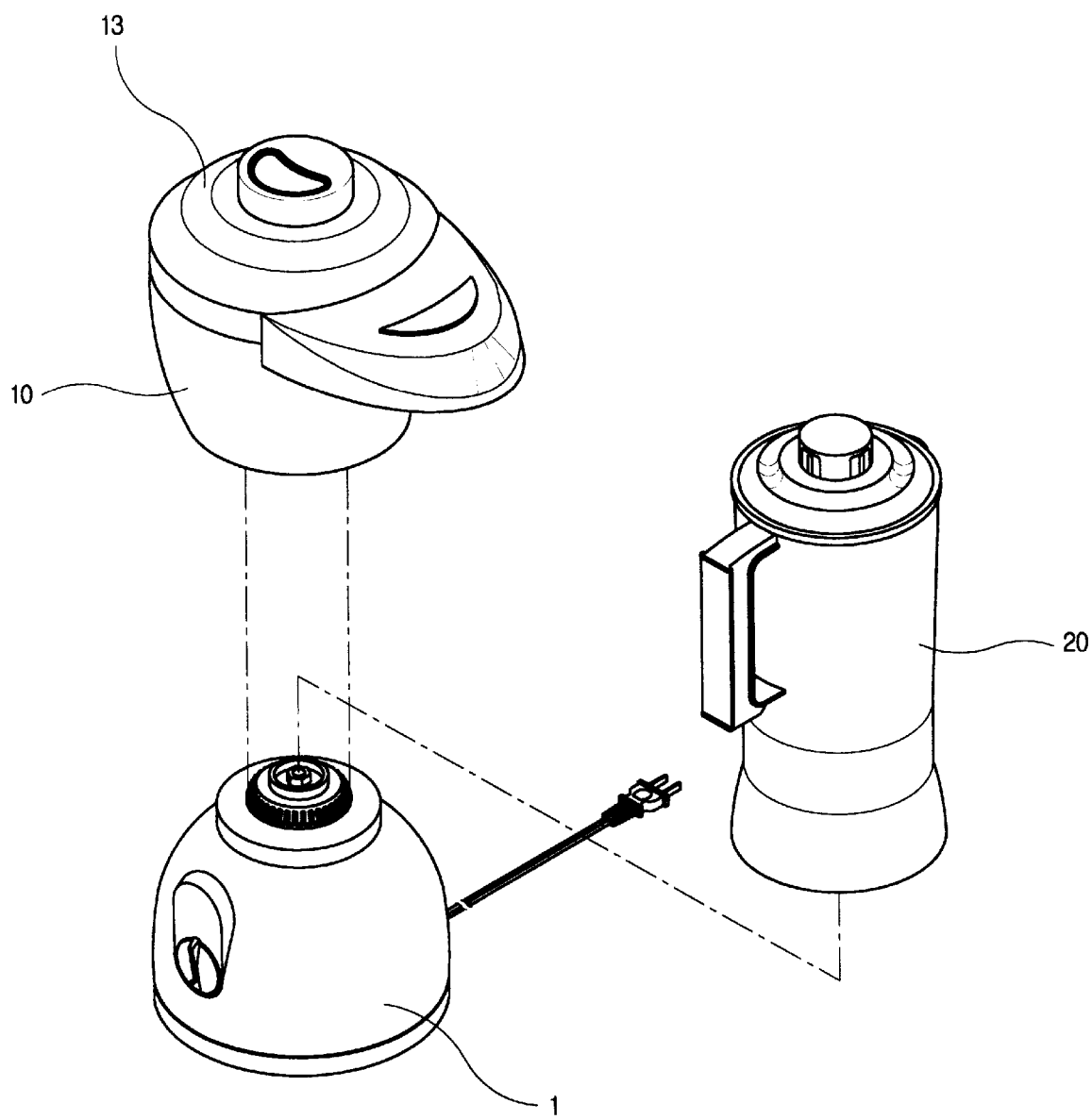
FIG. 1 is a whole perspective view showing the use state of this invention in two ways.
Figure 2:
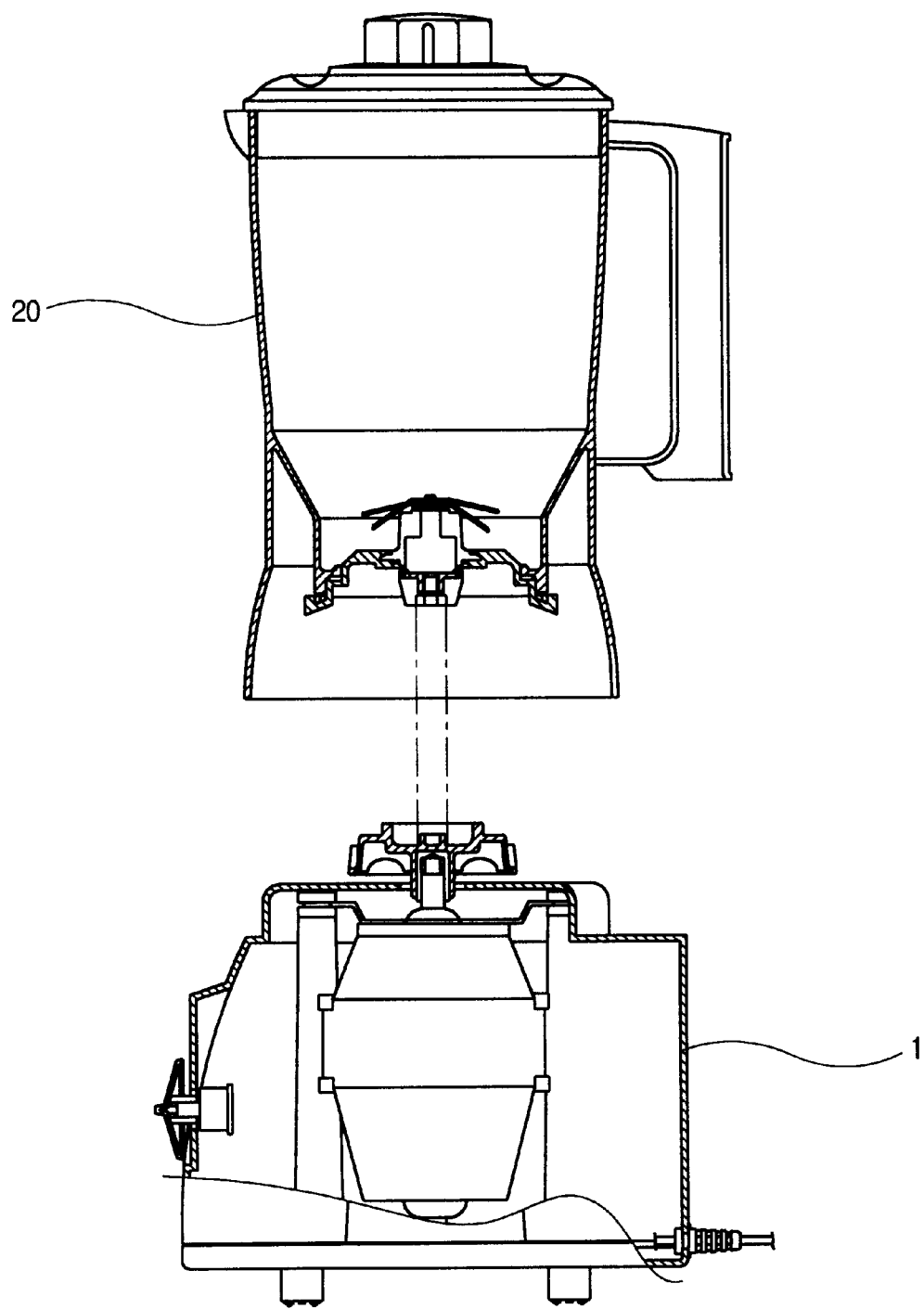
FIG. 2 is a separating sectional side view of the mixer according to the present invention.
Figure 3:
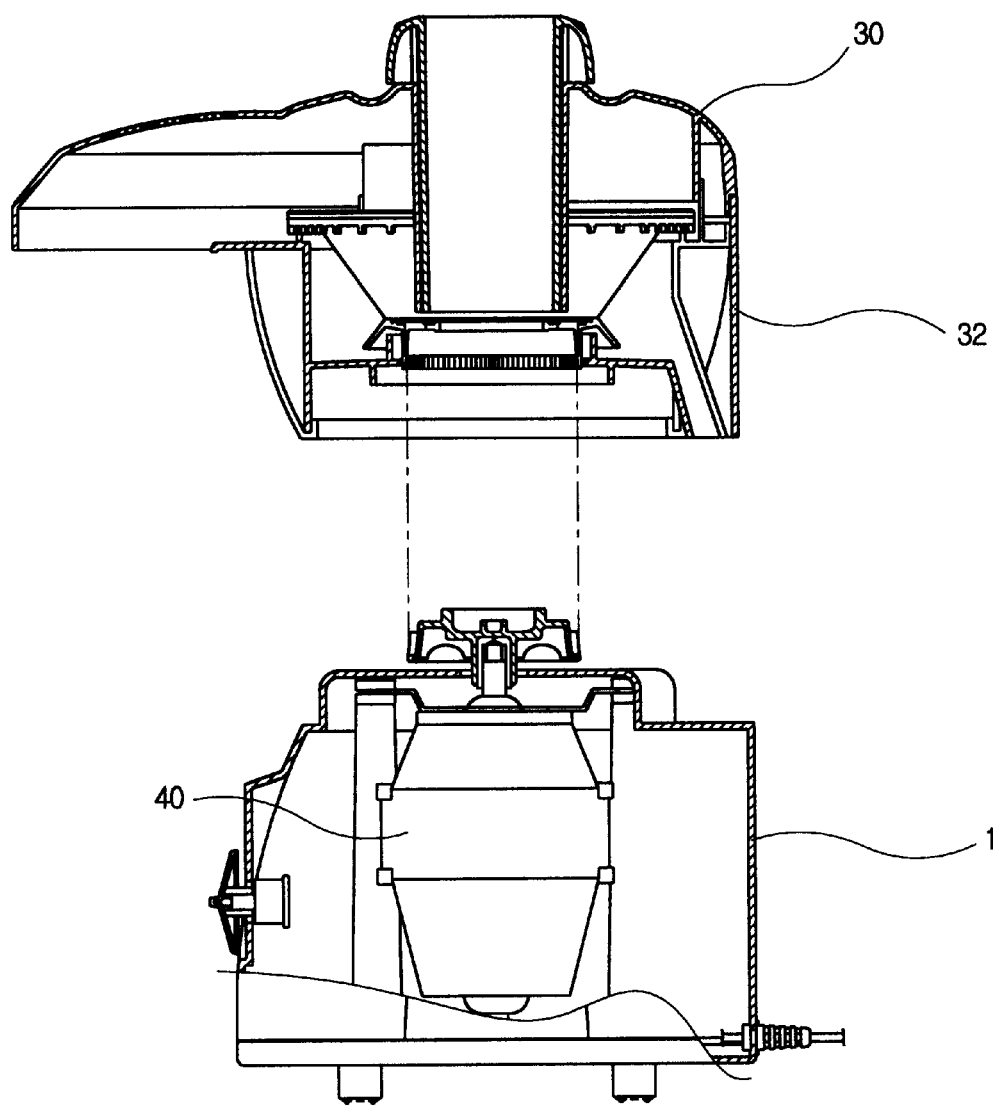
FIG. 3 is a separating sectional side view of the juice extractor according to the present invention.

FIG. 1 is a whole perspective view showing the use state of this invention in two ways, FIG. 2 is a separating sectional side view explaining to bind the mixing cup to the main body, FIG. 3 is a separating sectional side view explaining to bind the juice extracting cup to the main cup.

This invention produces a mixer adjustable for a juice extractor using the juice extracting cup 10 and the mixing cup 20 to one main body 1 in turns, wherein the switch 2 is installed at the top one side of the main body 1; the rotary bar 4 comprising the lever 3 is inserted into the one side of the switch 2; the square groove 8 is formed at the top of the rotary bar 4; at the other side of the switch 2, the pressing bar 6 comprising the pressing plate 5 is elastically installed by the spring 7, the rotatable rotary bar 11 is formed at the one side in the juice extracting cup 10; at the top of the rotary bar 11, the gear 12 including a large number of teeth is formed to engage with the rack 14 formed at the lower one side of the cover 13 of the juice extracting cup 10; the other end of the rotary bar 11 is formed in the square groove 15, the pressing bar 21 is formed at the one side in the mixing cup 20, whereby when the juice extracting cup 10 is connected to the main body 1 the lower square groove 15 of the rotary bar 11 is inserted into the upper square groove 8 of the rotary bar 4, when the mixing cup 20 is connected to the main body 1 the pressing bar 21 presses the pressing bar 6 of the main body.

The sign 40 which is not explained in drawings is a driving motor.

The operating embodiments of this invention are as follows.

Figure 4:
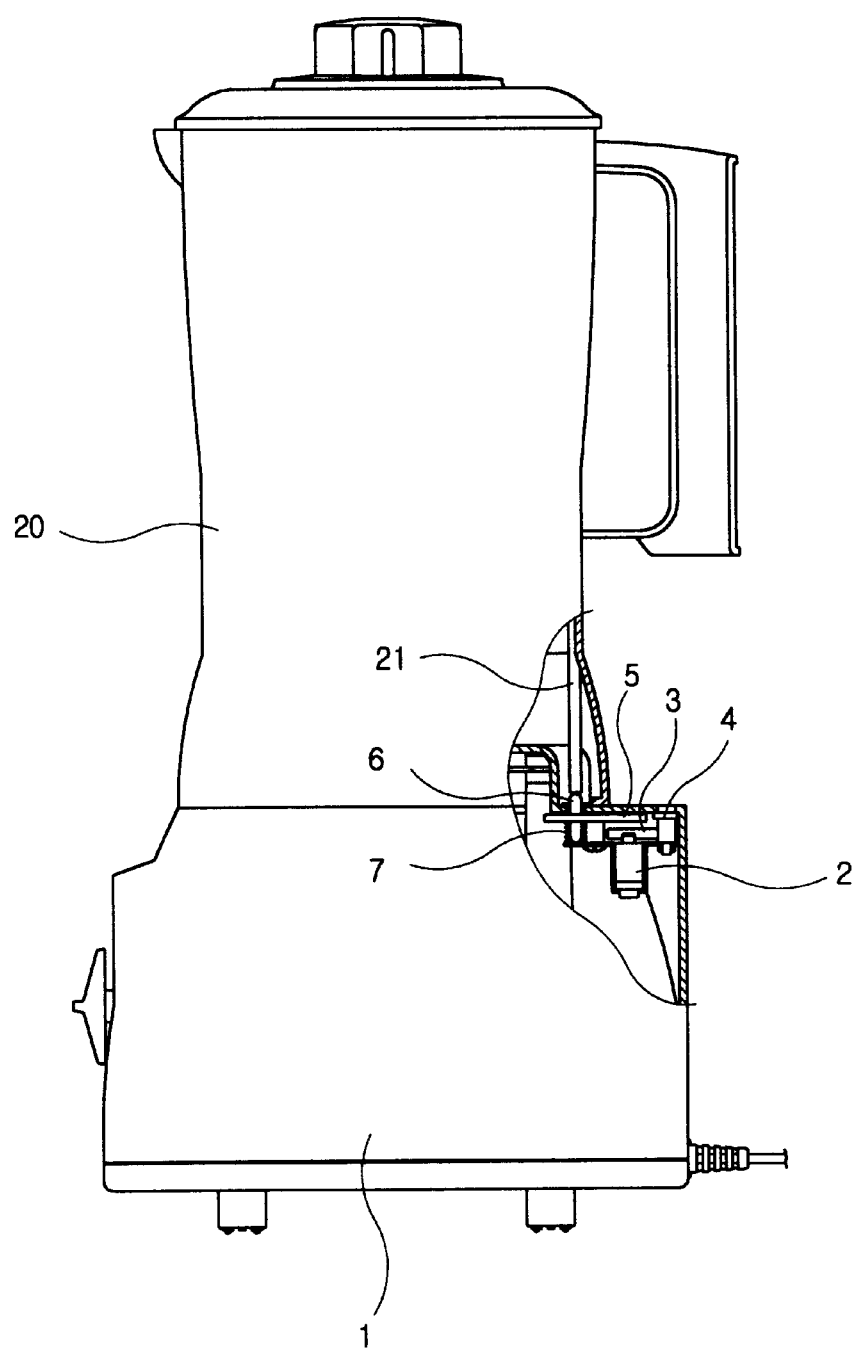
FIG. 4 is a sectional view showing the safety switch portion of the mixer according to the present invention.
Figure 6:
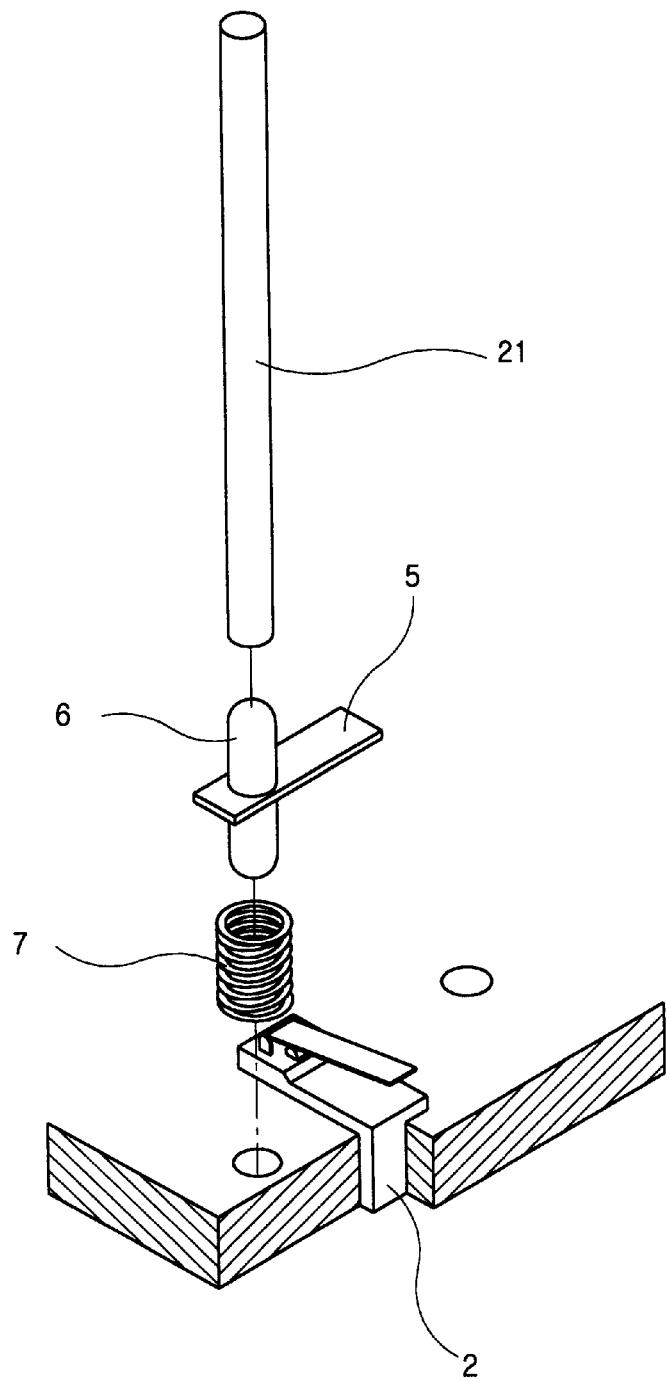
FIG. 6 is a perspective view showing the safety switch portion of the mixer according to the present invention.

FIG. 4 is a sectional view showing the safety switch structure at the state in which the mixing cup 20 and the main body 1 are bound according to this invention, and the switch structure is shown in FIG. 6 in more detail.

The lower end of the pressing bar 21 formed in the mixing cup 20 is in contact with the upper end of another pressing bar 6 fixed to the main body 1, by binding the main body 1 with the mixing cup 20, the pressing bar 6 is lowered to press the switch 2 by the pressing plate 5.

Thus, the switch which is isolated between the power and the driving motor 40 is connected so that the power is permitted to the driving motor 40 thereby making the driving motor 40 to be in rotatable state.

Therefore, an user can rotate the driving motor 40 with using the special button(not shown in drawings).

Also, when the mixing cup 20 after using is separated from the main body 1 for washing, the mixing cup 20 by an user is separated from the main body 1 simultaneously with detaching the pressing bar 21 of the mixing cup 20 and the pressing bar 6 of the main body 1, and the pressing plate 5 is isolated from the switch 2 by the restoring force of the spring 7 to shut off the power.

Thus, even if an user presses the operating button by an error, the power is not permitted to the main body 1 so that the driving motor 40 is not rotated.

Therefore, since the driving motor 40 is not rotated, the rotation of a pulverization blade or a clutch instrument like is not existed so that an user is in safety.

Figure 5:
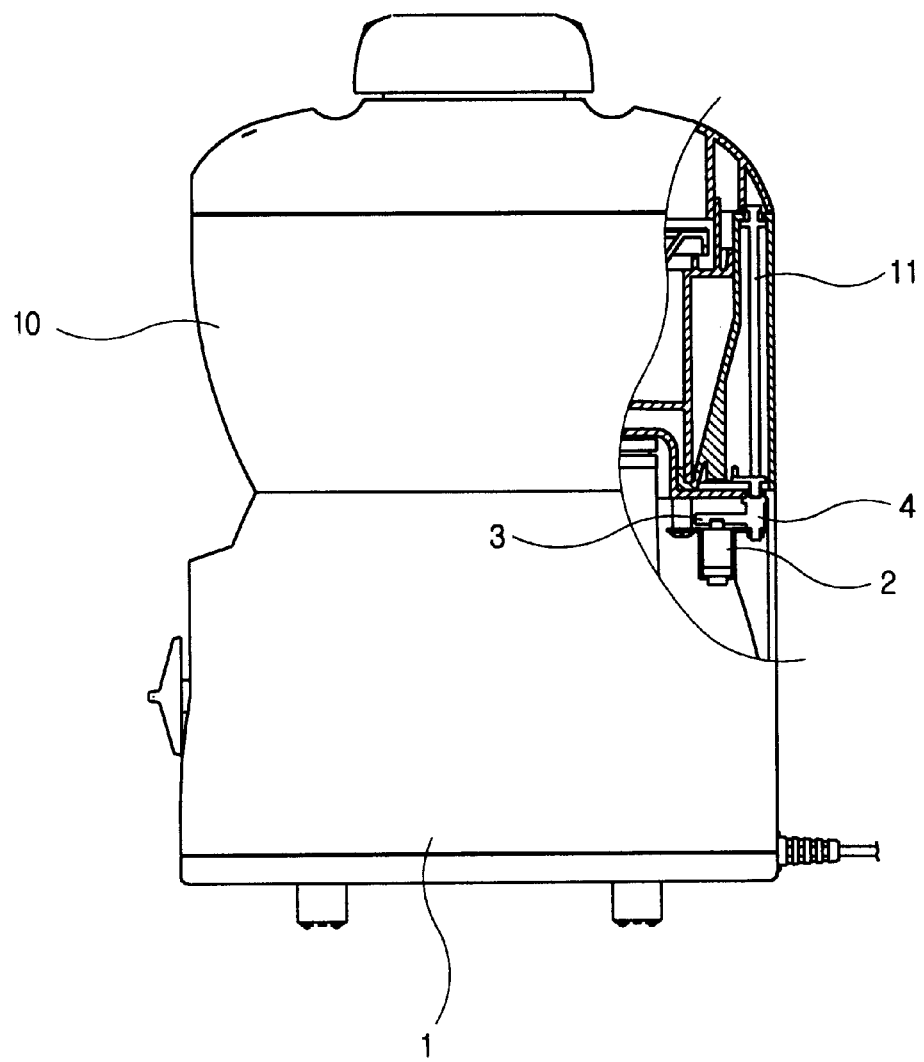
FIG. 5 is a sectional view showing the safety switch portion of the juice extractor according to the present invention.
Figure 7:
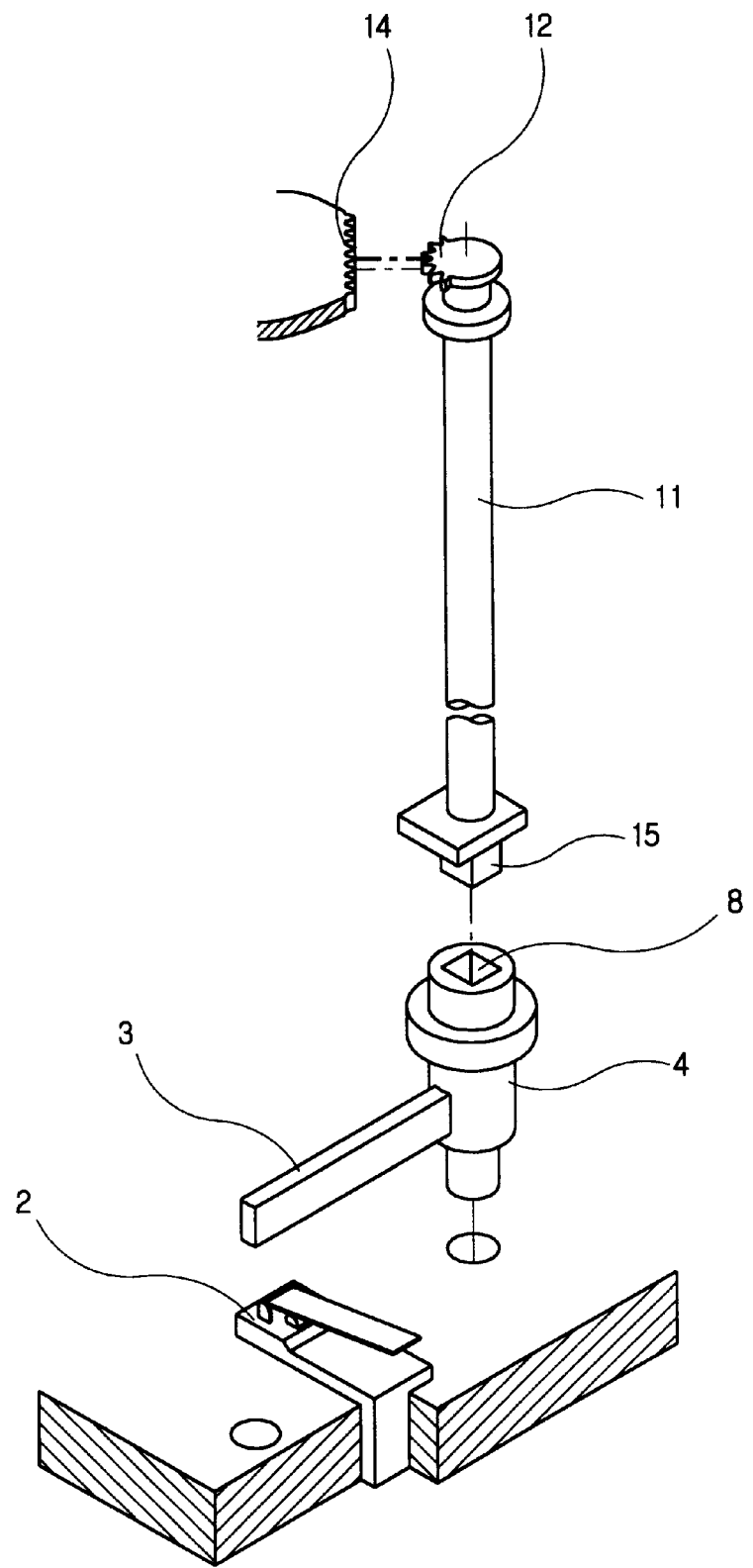
FIG. 7 is a perspective view showing the safety switch portion of the juice extractor according to the present invention.

Such operation of a safety switch is also applied to when the main body 1 and the juice extracting cup 20 are connected, as shown in FIG. 5 and FIG. 7, if the juice extracting cup 10 is connected to the top portion of the main body 1, the upper square grooves of the rotary bar 4 positioned at the main portion of the switch 2 in the main body 1 is inserted into the lower square groove 15 of the rotary bar 11 located vertically in the juice extracting cup 10.

Besides, since the juice extracting cup 10 is an instrument with the cover 13, if the power is permitted to the driving motor prior to closing the cover 13, it may be very dangerous to an user. Thus, the power should be permitted only in the state of the cover being closed.

Accordingly, if the cover 13 is turned to be closed at the state that the rotary bar 11 of the juice extracting cup 10 and the rotary bar 4 of the main body are connected each other, the lower rack 14 of the cover 13 and the upper gear 12 of the rotary bar 11 are engaged to rotate the gear 12 by the rotation of the rack 14 thereby rotating the rotary bar 11.

Namely, if the rotary bar 11 is rotated by the rotation of the cover 13, the rotary bar 4 inside the main body 1 is rotated together therewith, and then the lever 3 formed at the one side of the rotary bar 4 is rotated to be joined to the switch 2.

Thus, in case of a juice extracting cup, it can be used only in the state of the cover being closed according to the characteristic in using, on the contrary, if the cover 13 is opened, the power is shut off so that the driving motor 40 is not rotated.

Therefore, the inside dregs can be removed in the state that the cover 13 of the juice extracting cup 10 is opened, and if the cover 13 is again closed for permitting the power, the juice can be continued to be extracted safely.

The switch structure of this invention as above can control the power only by binding the main body 1 with the juice extracting cup 10 or the mixing cup 20 which is alternated so that the use thereof is very easy, at the state that these juice extracting cup 10 or mixing cup 20 is separated from the main body 1, namely pulverizing blades or gear like is projected outside, the power is not permitted so that it can be used more safely.

The safety switch structure of a mixer adjustable for a juice extractor according to the present invention is operated as above to have some effect that: only in case that each juice extracting cup or mixing cup is connected to a main body, a safety switch is operated by each pressing device so that both of the juice extracting cup and the mixing cup can be used safely.

What is claimed is:

1. A safety switch structure of a mixer adjustable for a juice extractor, characterized in that the mixer adjustable for a juice extractor uses the juice extracting cup (10) and the mixing cup (20) to one main body (1) in turns, wherein a switch (2) is installed at a top one side of the main body (1); a rotary bar (4) comprising a lever (3) is inserted into a one side of the switch (2); a square groove (8) is formed at a top of the rotary bar (4); at the other side of the switch (2), a pressing bar (6) comprising a pressing plate (5) is elastically installed by a spring (7), a rotatable rotary bar 11 is formed at a one side of the juice extracting cup (10); at the top of the rotary bar (11), a gear (12) including a large number of teeth is formed to engage with a rack (14) formed at the lower one side of a cover (13) of the juice extracting cup (10); the other end of the rotary bar (11) is formed in a square groove (15), a pressing bar (21) is formed at a one side in the mixing cup (20), whereby when the juice extracting cup (10) is connected to the main body (1) the lower square groove (15) of the rotary bar (11) is inserted into the upper square groove (8) of the rotary bar (4), when the mixing cup (20) is connected to the main body (1) the pressing bar (21) presses the pressing bar (6) in the main body.

\* \* \* \* \*